United States Patent
Nagata et al.

(10) Patent No.: US 11,561,290 B2
(45) Date of Patent: Jan. 24, 2023

(54) DISTANCE IMAGE GENERATING DEVICE AND DISTANCE IMAGE GENERATING METHOD

(71) Applicant: Panasonic Intellectual Property Management Co., Ltd., Osaka (JP)

(72) Inventors: Taichi Nagata, Osaka (JP); Keiichi Mori, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 691 days.

(21) Appl. No.: 16/579,170

(22) Filed: Sep. 23, 2019

(65) Prior Publication Data

US 2020/0018824 A1 Jan. 16, 2020

Related U.S. Application Data

(63) Continuation of application No. PCT/JP2018/012303, filed on Mar. 27, 2018.
(Continued)

(51) Int. Cl.
*G01S 7/484* (2006.01)
*G01S 7/48* (2006.01)
(Continued)

(52) U.S. Cl.
CPC ............ *G01S 7/484* (2013.01); *G01S 7/4808* (2013.01); *G01S 7/4863* (2013.01); *G01S 17/10* (2013.01)

(58) Field of Classification Search
CPC ...... G01S 7/484; G01S 7/4808; G01S 7/4863; G01S 17/10; G01S 7/4868; G01S 17/89; G01C 3/06
See application file for complete search history.

(56) References Cited

U.S. PATENT DOCUMENTS 5,705,807 A 1/1998 Throngnumchai et al.
6,141,105 A * 10/2000 Yahashi ............ G01B 11/2518
356/623

(Continued)

FOREIGN PATENT DOCUMENTS

JP S60-064283 A 4/1985
JP H8-304540 A 11/1996
(Continued)

OTHER PUBLICATIONS

International Search Report issued in corresponding International Patent Application No. PCT/JP2018/012303, dated Jun. 12, 2018, with English translation.

*Primary Examiner* — Seung C Sohn
(74) *Attorney, Agent, or Firm* — McDermott Will & Emery LLP

(57) ABSTRACT

A distance image generating device includes a light emitter that emits light pulses; a light receiver that includes light receiving elements and receives reflected light; a distance calculator that generates a distance image based on an amount of the reflected light; and a light amount adjuster that determines an emission count in accordance with which the light emitter is to emit the light pulses and an exposure count in accordance with which the light receiver is to receive the reflected light based on the distance image and causes the light emitter to emit the light pulses in accordance with the determined emission count and the light receiver to receive the reflected light in accordance with the determined exposure count. The distance calculator calculates the distance based on an amount of the reflected light received at the exposure count by the light receiver.

20 Claims, 7 Drawing Sheets

Related U.S. Application Data

(60) Provisional application No. 62/478,829, filed on Mar. 30, 2017.

(51) Int. Cl.
    *G01S 17/10*    (2020.01)
    *G01S 7/4863*    (2020.01)

(56) References Cited

U.S. PATENT DOCUMENTS

| | | | |
|---|---|---|---|
| 6,442,345 B1 * | 8/2002 | Kindaichi | G03B 13/36 |
| | | | 396/106 |
| 6,516,150 B1 | 2/2003 | Ishii et al. | |
| 10,073,164 B2 * | 9/2018 | Otani | G01S 17/10 |
| 10,310,084 B2 * | 6/2019 | Murai | G01S 7/4868 |
| 10,545,239 B2 * | 1/2020 | Kishimoto | G01S 17/10 |
| 2012/0177252 A1 | 7/2012 | Korekado et al. | |
| 2016/0320486 A1 | 11/2016 | Murai et al. | |
| 2018/0045513 A1 | 2/2018 | Kitamura et al. | |

FOREIGN PATENT DOCUMENTS

| | | |
|---|---|---|
| JP | 2001-059934 A | 3/2001 |
| JP | 2011-064498 A | 3/2011 |
| JP | 2011-179997 A | 9/2011 |
| WO | 2015/107869 A1 | 7/2015 |
| WO | 2016/208214 A1 | 12/2016 |

* cited by examiner

FIG. 3
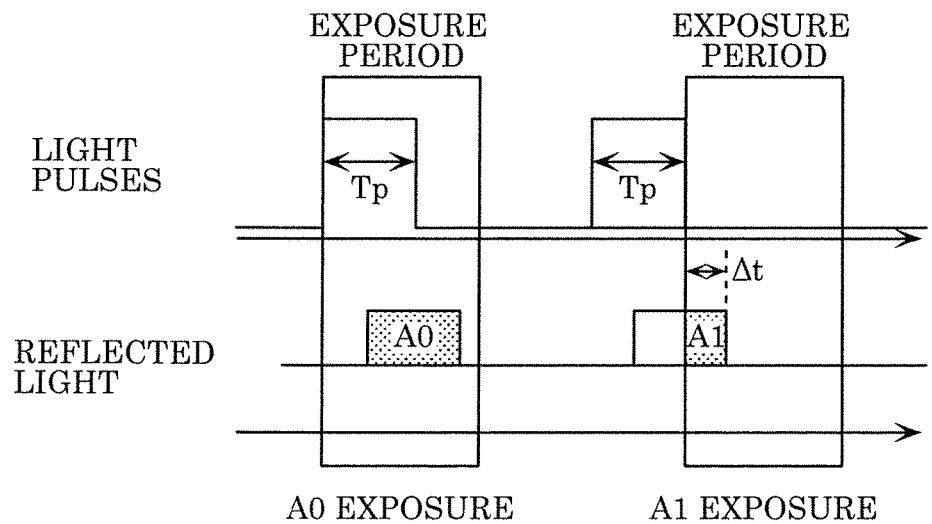
FIG. 4
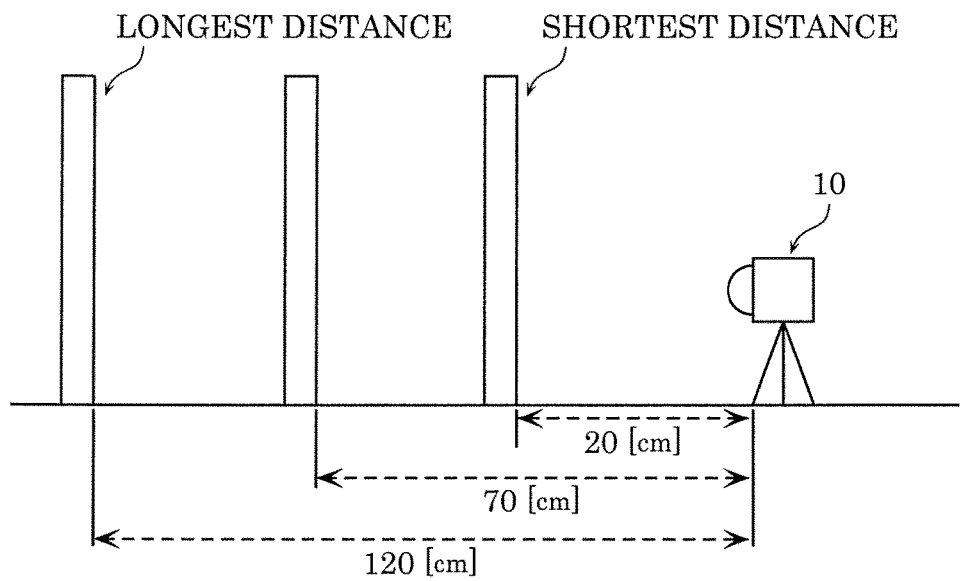
FIG. 5
| DISTANCE RANGE | FIRST RANGE (- 20 cm) | SECOND RANGE (20 - 70 cm) | THIRD RANGE (70 - 120 cm) | FOURTH RANGE (120 cm -) |
|---|---|---|---|---|
| EMISSION/ EXPOSURE COUNT | 200 | 300 | 500 | 700 |

FIG. 9A

| DISTANCE RANGE | 20 cm | 70 cm | 120 cm |
|---|---|---|---|
| EMISSION/ EXPOSURE COUNT | 200 | 400 | 700 |

DISTANCE IMAGE GENERATING DEVICE AND DISTANCE IMAGE GENERATING METHOD

CROSS REFERENCE TO RELATED APPLICATIONS

This application is a U.S. continuation application of PCT International Patent Application Number PCT/JP2018/012303 filed on Mar. 27, 2018, claiming the benefit of priority of U.S. Provisional Patent Application No. 62/478,829 filed on Mar. 30, 2017, the entire contents of which are hereby incorporated by reference.

BACKGROUND

1. Technical Field

The present disclosure relates to a distance image generating device and a distance image generating method and relates, in particular, to a distance image generating device having a function of adjusting the amount of pulsed light and reflected light.

2. Description of the Related Art

In recent years, distance image sensors (i.e., distance image generating devices) that obtain distance images in real time are attracting attention in a number of fields including robotics, vehicles, security and amusement. A distance image provides three-dimensional information of an object within a space and is composed of pixel values indicating the distance to the object (i.e., captured subject). A distance image is also referred to as a range image or a depth map.

The Time-Of-Flight (also referred to below simply as "TOF") system is one method used to measure the distance to obtain a distance image. In the TOF system, a distance image is obtained with use of the time of flight spent by an emitted light pulse, such as near-infrared light, till its reflected light from an object is received. The required amount of light to be emitted for measuring the distance in the TOF system varies depending on the distance to an object and the reflectance of the object. Therefore, the required amount of light to be emitted cannot be found in advance. Accordingly, various techniques have been proposed to date to adjust the required amount of light to be emitted for measuring the distance in the TOF system (see, for example, Japanese Unexamined Patent Application Publication No. 60-064283 and Japanese Unexamined Patent Application Publication No. 2011-179997).

Japanese Unexamined Patent Application Publication No. 60-064283 discloses a method of setting, in advance, the amount of light to be emitted from a light emitting element to an amount suitable for measuring the distance. In this method, the light emitting element is made to emit light, and the amount of light to be emitted is reduced gradually when the amount of reflected light received by a light receiving element is greater than the amount of light suitable for measuring the distance or is increased gradually when the amount of the reflected light is smaller than the amount of light suitable for measuring the distance.

Meanwhile, in a method disclosed in Japanese Unexamined Patent Application Publication No. 2011-179997, light amount adjusting means for adjusting the amount of light to be emitted is provided, and the intensity (i.e., the wattage) of light pulses is adjusted by the light amount adjusting means in accordance with the captured subject and/or the distance.

The technique disclosed in Japanese Unexamined Patent Application Publication No. 60-064283 is effective in a distance measuring device constituted by a single light emitting element and a single light receiving element. However, when a plurality of light receiving elements are provided for a single light emitting element, the amount of light received by the plurality of light receiving elements cannot be set to an appropriate value. This poses a problem that the above technique cannot be applied to a distance image generating device that generates a distance image with a single light emitting element and a plurality of light receiving elements.

The technique disclosed in Japanese Unexamined Patent Application Publication No. 2011-179997 can be applied to a distance image generating device. However, this technique requires a dedicated light source driver for adjusting the intensity of light pulses, leading to a problem that the cost of the distance image generating device increases. Alternatively, when no dedicated light source driver is used, analog control is required to adjust the intensity of light pulses. This poses a problem that it becomes difficult to adjust the amount of light to be emitted.

The present disclosure has been made in view of the above and is directed to providing a distance image generating device and a distance image generating method capable of adjusting a required amount of light to be emitted for measuring a distance more simply than before.

SUMMARY

To achieve the above, a distance image generating device according to an aspect of the present disclosure includes a light emitter, a light receiver, a distance calculator, and a light amount adjuster. The light emitter emits light pulses to an object. The light receiver includes a plurality of light receiving elements. The light receiver receives reflected light corresponding to the light pulses in an exposure period associated with an emission period of the light pulses. The distance calculator generates a distance image by calculating a distance to the object from each of the plurality of light receiving elements, based on an amount of the reflected light received by the light receiver. The light amount adjuster determines an emission count in accordance with which the light emitter is to emit the light pulses and an exposure count in accordance with which the light receiver is to receive the reflected light, based on the distance image generated by the distance calculator. The light amount adjuster also causes the light emitter to emit the light pulses in accordance with the emission count determined by the light amount adjuster and the light receiver to receive the reflected light in accordance with the exposure count determined by the light amount adjuster. The distance calculator calculates the distance, based on an amount of the reflected light received in accordance with the exposure count by the light receiver.

To achieve the above object, a distance image generating method according to an aspect of the present disclosure is a distance image generating method of generating a distance image with a distance image generating device. The distance image generating device includes a light emitter and a light receiver. The light emitter emits light pulses to an object. The light receiver includes a plurality of light receiving elements and receives reflected light corresponding to the light pulses in an exposure period associated with an emission period of the light pulses. The distance image generating method includes generating a distance image by calculating a distance to the object from each of the plurality of light receiving elements, based on an amount of the reflected light received by the light receiver; and adjusting the amount of the reflected light including determining an emission count in accordance with which the light emitter is to emit the light pulses and an exposure count in accordance with which the light receiver is to receive the reflected light, based on the distance image generated in the generating. The adjusting also includes causing the light emitter to emit the light pulses in accordance with the emission count determined in the adjusting and the light receiver to receive the reflected light in accordance with the exposure count determined in the adjusting. In the generating the distance is calculated based on an amount of the reflected light received in accordance with the exposure count by the light receiver.

The present disclosure can be implemented not only in the form of a distance image generating device and a distance image generating method but also in the form of a program that causes a computer to execute the distance image generating method or in the form of a non-transitory computer-readable recording medium, such as a CD-ROM, having such a program recorded therein.

The present disclosure provides a distance image generating device and a distance image generating method capable of adjusting the required amount of light to be emitted for measuring the distance more simply than before.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is an illustration for describing a method with which a distance calculator illustrated in FIG. 1 calculates a distance;

FIG. 4 is an illustration for describing a plurality of distance ranges used by a light amount adjuster illustrated in FIG. 1 to determine an emission count and an exposure count;

FIG. 5 illustrates an example of set counts corresponding to respective preset distance ranges used by the light amount adjuster illustrated in FIG. 1;

FIG. 9A illustrates an example of set counts corresponding to respective preset distances used by a light amount adjuster according to Variation 3 of an embodiment.

DETAILED DESCRIPTION OF THE EMBODIMENT

Figure 1:
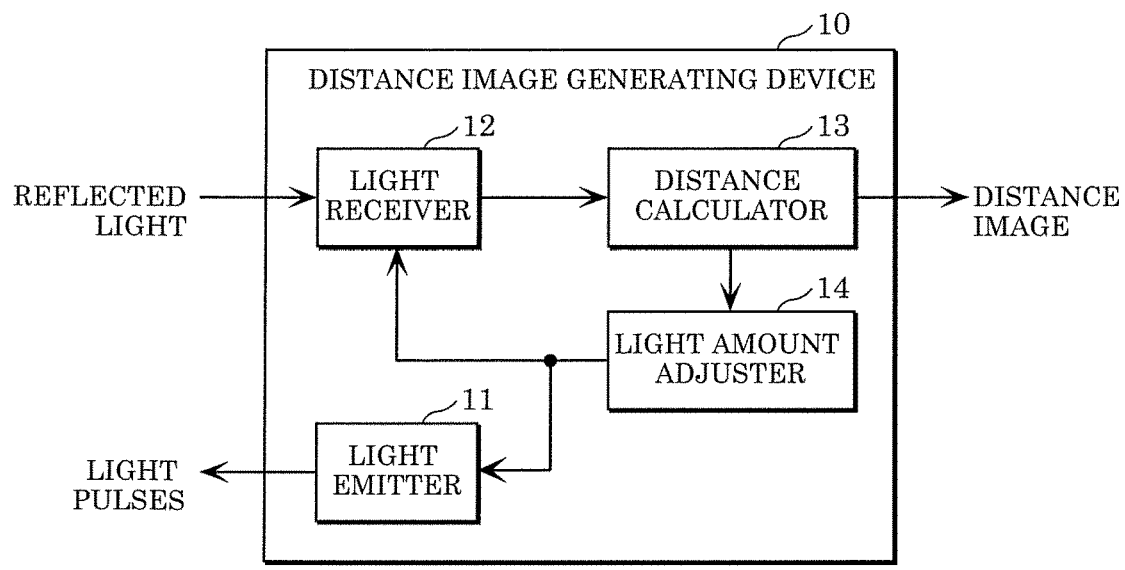
FIG. 1 is a block diagram illustrating a configuration of a distance image generating device according to an embodiment.

Hereinafter, an embodiment of the present disclosure will be described in detail with reference to the drawings. The embodiment described hereinafter illustrates a specific example of the present disclosure. The numerical values, the shapes, the materials, the constituent elements, the arrangement positions and the connection modes of the constituent elements, the steps, the orders of the steps, and so on illustrated in the following embodiment are examples and are not intended to limit the present disclosure. Among the constituent elements in the following embodiment, any constituent element that is not described in independent claims expressing the broadest concept of the present disclosure is to be construed as an optional constituent element. The drawings do not necessarily provide the exact depiction. In the drawings, substantially identical configurations are given identical reference characters, and duplicate descriptions thereof may be omitted or the descriptions may be simplified.

FIG. 1 is a block diagram illustrating a configuration of distance image generating device 10 according to an embodiment. Distance image generating device 10 generates a distance image through the TOF system. Distance image generating device 10 includes light emitter 11, light receiver 12, distance calculator 13, and light amount adjuster 14.

Light emitter 11 is a light source that emits light pulses to an object. Light emitter 11 is, for example, a laser element or a light-emitting diode (LED) that emits infrared light.

Light receiver 12 is a sensor that includes a plurality of light receiving elements. Light receiver 12 receives reflected light corresponding to light pulses in an exposure period that is associated with an emission period of the light pulses in light emitter 11. Light receiver 12 is, for example, an image sensor that includes photodiodes disposed two-dimensionally. Light receiver 12, for example, outputs a digital value indicating the amount of received light in each photodiode.

Distance calculator 13 is a circuit that generates a distance image (i.e., a frame) by calculating the distance from each of the plurality of light receiving elements to an object on the basis of the amount of reflected light received by light receiver 12. Distance calculator 13 is, for example, a signal processing circuit that includes a random-access memory (RAM), a read-only memory (ROM), and a processor. The RAM temporarily stores data and so on output from light receiver 12. The ROM stores a program. The processor executes the program. Distance calculator 13 iteratively calculates, for each frame, the distance from each light receiving element on the basis of the total amount of reflected light received in accordance with the exposure count by light receiver 12.

Light amount adjuster 14 is a circuit that adjusts the required amount of light to be emitted. Light amount adjuster 14 determines, on the basis of the distance image generated by distance calculator 13, an emission count in accordance with which light emitter 11 is to emit light pulses and an exposure count in accordance with which light receiver 12 is to receive reflected light. Light amount adjuster 14 then causes light emitter 11 to emit light pulses in accordance with the determined emission count and light receiver 12 to receive reflected light in accordance with the determined exposure count. Light amount adjuster 14 is, for example, a signal processing circuit that includes a RAM, a ROM that stores a program, and a processor that executes the program.

To be more specific, light amount adjuster 14 calculates a representative distance to an object with use of a distance image. On the basis of the calculated representative distance, light amount adjuster 14 then determines, as the emission count and the exposure count, one set count selected from a plurality of set counts corresponding to respective preset distance ranges. The representative distance is, for example, one distance to the object indicated by the distance image or a mean, a median, a minimum, a maximum, or a mode of a plurality of distances to the object. The plurality of distances to the object are identified, for example, by all the distances indicated by the distance image, the distances among all the distances indicated by the distance image that fall within a distance range preset as a range within which distance image generating device 10 can measure the distance, or the distances that fall within a predetermined range from to the distance at the center of the two-dimensional space in the distance image.

Light amount adjuster 14, iteratively for each frame, determines the emission count and the exposure count in a second frame following a first frame (in the present embodiment, the second frame immediately follows the first frame) on the basis of the distance image of the first frame (specifically, calculation of the representative distance) and controls light emitter 11 and light receiver 12. In this case, light amount adjuster 14 generates the distance image and determines the emission count and the exposure count in pipeline and in parallel. For example, light amount adjuster 14 generates the distance image of the second frame and determines the emission count and the exposure count that are based on the distance image of the first frame in parallel.

In the present embodiment, from the distance measuring principle described later with reference to FIG. 3, the emission count and the exposure count are equal. Thus, the emission count and the exposure count may be expressed by a single numerical value.

Figure 2A:
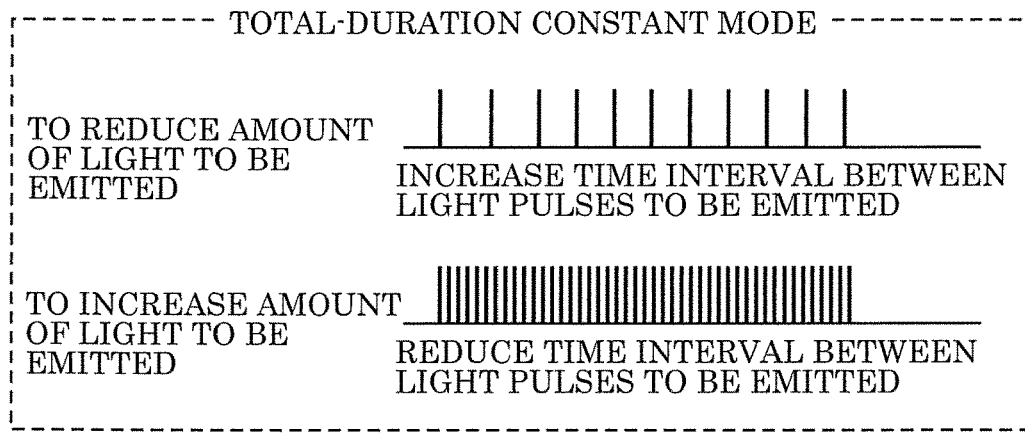
FIG. 2A is an illustration for describing a total-duration constant mode of a distance image generating device according to an embodiment.

For the method of controlling light emitter 11 and light receiver 12 by light amount adjuster 14, either one of the following two is selected. In one method, the total duration is kept constant, and the time interval between consecutively emitted light pulses is adjusted (this method is also referred to below as a "total-duration constant mode"). FIG. 2A is an illustration for describing the total-duration constant mode of distance image generating device 10 according to the embodiment. FIG. 2A illustrates the timings at which the light pulses are emitted (i.e., the timing of the emission period). FIG. 2A omits the depiction of the exposure period associated with the emission period for convenience of description. As illustrated in FIG. 2A, in the total-duration constant mode, light amount adjuster 14 causes light emitter 11 to emit light pulses in accordance with a determined emission count in a predetermined duration and light receiver 12 to receive reflected light in accordance with a determined exposure count. In other words, light amount adjuster 14 increases the time interval between emitted light pulses to reduce the amount of light to be emitted or reduces the time interval between emitted light pulses to increase the amount of light to be emitted.

Figure 2B:
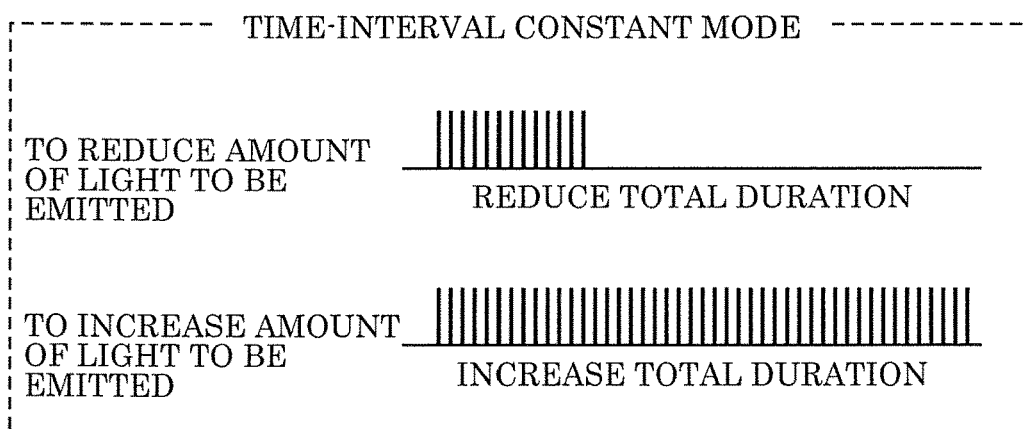
FIG. 2B is an illustration for describing a time-interval constant mode of a distance image generating device according to an embodiment.

In the other method, the time interval between consecutively emitted light pulses is kept constant, and the total duration is adjusted (this method is also referred to below as a "time-interval constant mode"). FIG. 2B is an illustration for describing the time-interval constant mode of distance image generating device 10 according to the embodiment. FIG. 2B illustrates the timings at which the light pulses are emitted (i.e., the timing of the emission period). FIG. 2B omits the depiction of the exposure period associated with the emission period for convenience of description. As illustrated in FIG. 2B, in the time-interval constant mode, light amount adjuster 14 causes light emitter 11 to iteratively emit light pulses in accordance with the emission count at a preset constant time interval and light receiver 12 to iteratively receive reflected light in accordance with the exposure count at a constant time interval. In other words, light amount adjuster 14 reduces the total duration of the light pulses emitted at a constant time interval (i.e., reduces the number of light pulses) to reduce the amount of light to be emitted or increases the total duration of the light pulses emitted at a constant time interval (i.e., increases the number of light pulses) to increase the amount of light to be emitted.

The selection between the total-duration constant mode and the time-interval constant mode is set in advance on the basis of a user's instruction or the like.

FIG. 3 is an illustration for describing a method with which distance calculator 13 illustrated in FIG. 1 calculates the distance. FIG. 3 illustrates timings of two types of emission and exposure sets that differ in terms of the association (i.e., timings) between the emission period and the exposure period (one of the two types of sets is referred to as an "A0 exposure" and the other is referred to as an "A1 exposure").

In the A0 exposure, light emitter 11 emits light pulses having fixed emission period Tp. Light receiver 12 receives reflected light (the amount of received light in this case is denoted by A0) in an exposure period associated with this emission period (in this case, the exposure period extends from the start timing of the emission period Tp to a predetermined timing that comes after the end timing of the emission period Tp).

In the A1 exposure, light emitter 11 emits light pulses having emission period Tp equal to the emission period Tp in the A0 exposure. Light receiver 12 receives (in this example, receives in duration Δt) reflected light (the amount of received light in this case is denoted by A1) in an exposure period associated with this emission period (in this case, the exposure period extends from the end timing of the emission period Tp to a point at which a certain duration has passed since the end timing).

Distance calculator 13 calculates distance Z in accordance with the following expression (1).

$$Z = c \times (Tp/2) \times (A1/A0) \tag{1}$$

In the above, c is the speed of light.

The above expression (1) is derived as follows. Specifically, since distance Z is the time of flight of light, distance Z is expressed through the following expression (2) with use of duration Δt indicated in FIG. 3.

$$Z = c \times (\Delta t/2) \tag{2}$$

The above expression (2) can be transformed into the following expression (3), upon the right-hand side having been multiplied by (Tp/Tp).

$$Z = c \times (Tp/2) \times (\Delta t/Tp) \tag{3}$$

Of (Δt/Tp) in the right-hand side of the above expression (3), Δt can be substituted by A1, and Tp can be substituted by A0. With these substitutions, the above expression (1) is derived.

Distance calculator 13 calculates the distance to the object with use of the emission period and the total amount of reflected light in the exposure period associated with the emission period of a plurality of light pulses. In other words, distance calculator 13 uses, as A0 in the above expression (1), the total amount of received light A0 in the A0 exposure of the instances corresponding to the exposure count determined for each frame and uses, as A1 in the above expression (1), the total amount of received light A1 in the A1 exposure of the instances corresponding to the exposure count determined for each frame. Thus, distance calculator 13 calculates the distance for each frame.

In the present embodiment, in determining the emission count and the exposure count, light amount adjuster 14 determines the final emission count and exposure count by treating the emissions (i.e., two emissions) and the exposures (i.e., two exposures) illustrated in FIG. 3 as "one count of the emission count and the exposure count" (i.e., one set).

FIG. 4 is an illustration for describing a plurality of distance ranges to be used by light amount adjuster 14 illustrated in FIG. 1 to determine the emission count and the exposure count. In this example, for the distances from distance image generating device 10 to the object, the following distance ranges are illustrated: a distance range of less than 20 cm, which is the shortest distance; a distance range of from the shortest distance up to 70 cm; a distance range of from 70 cm up to 120 cm, which is the longest distance; and a distance range of no less than the longest distance. The shortest distance is typically the smallest distance that distance image generating device 10 can measure or may instead be a value obtained by adding or subtracting an offset to or from such a smallest distance. The longest distance is typically the greatest distance that distance image generating device 10 can measure or may instead be a value obtained by adding or subtracting an offset to or from such a greatest distance.

In the present embodiment, as illustrated in FIG. 5, light amount adjuster 14 uses, as the emission count and the exposure count to be determined, one of the four set values corresponding to the respective distance ranges illustrated in FIG. 4. In other words, light amount adjuster 14 calculates the representative distance to the object with use of the distance image of an immediately preceding frame. On the basis of the calculated representative distance, light amount adjuster 14 determines, as the emission count and the exposure count in the next frame, one set count selected from a plurality of set counts corresponding to the respective preset distance ranges.

FIG. 5 illustrates an example of set counts corresponding to the respective preset distance ranges to be used by light amount adjuster 14 illustrated in FIG. 1. For a first range (less than 20 cm, or the shortest distance), a second range (from the shortest distance up to 70 cm), a third range (from 70 cm up to 120 cm, or the longest distance), and a fourth range (no less than the longest distance), the set counts (i.e., the emission count and the exposure count to be determined) of 200, 300, 500, and 700, respectively, are set. The smallest value (i.e., the set count of the first range) among the above set counts is set to a value (i.e., 200) suitable for measuring the shortest of the distance ranges to be measured. The largest value (i.e., the set count of the fourth range) among the above set counts is set to a value (i.e., 700) suitable for measuring the longest of the distance ranges to be measured. These set counts may be stored in light amount adjuster 14 in the form of a data table.

Now, an operation of distance image generating device 10 according to the present embodiment configured as described above will be described.

Figure 6:
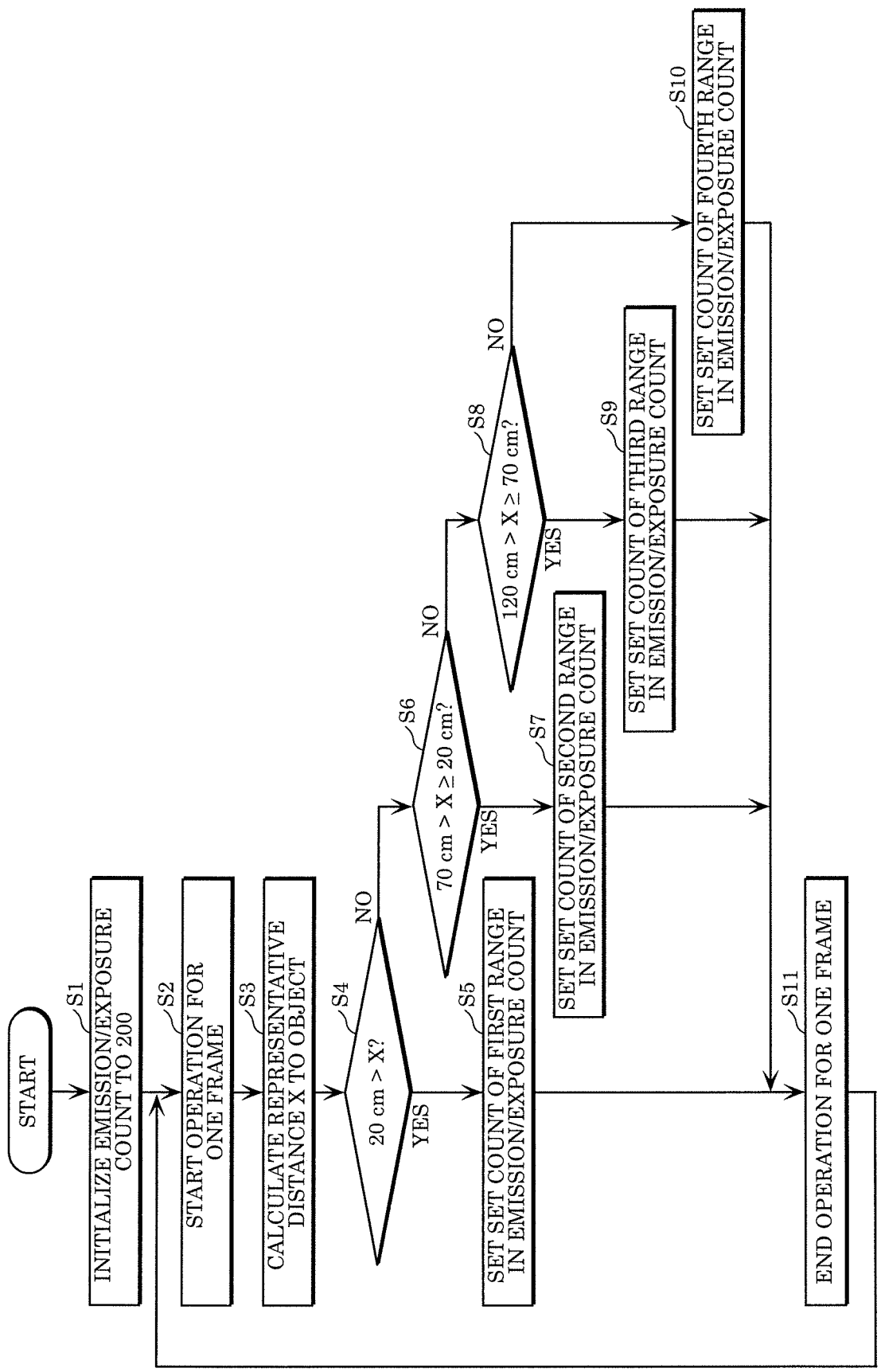
FIG. 6 is a flowchart illustrating an operation of a distance image generating device according to an embodiment.

FIG. 6 is a flowchart illustrating an operation of distance image generating device 10 according to the embodiment (i.e., distance image generating method).

First, in an initial state in which no distance image has been generated, light amount adjuster 14 determines, as the emission count and the exposure count, the set count corresponding to the shortest distance range among the plurality of distance ranges (S1). Specifically, light amount adjuster 14 determines the set count corresponding to the first range (200 in this example) as the initial value of the emission count and the exposure count (i.e., initializes the emission count and the exposure count).

Light amount adjuster 14 then starts an operation for one frame by causing light emitter 11 to emit light pulses in accordance with the determined emission count and light receiver 12 to receive reflected light in accordance with the determined exposure count (S2). Specifically, in a first instance, under the control of light amount adjuster 14, light emitter 11 emits light pulses 200 times, and light receiver 12 receives reflected light from 200 exposures. Thus, the A0 exposure and the A1 exposure illustrated in FIG. 3 are iteratively performed 200 times. Then, distance calculator 13 generates a distance image (i.e., a frame) by calculating the distance to the object from each of the plurality of light receiving elements in accordance with the above expression (1) on the basis of the amount of reflected light received by light receiver 12.

Light amount adjuster 14 then calculates representative distance X to the object with use of the distance image generated by distance calculator 13 (S3). For example, light amount adjuster 14 calculates, as representative distance X, the distance at the center of the two-dimensional space in the distance image.

On the basis of calculated representative distance X, light amount adjuster 14 then determines one set count selected from the plurality of set counts corresponding to the respective preset distance ranges as the emission count and the exposure count for measuring the distance in the next frame (S4 to S10).

Specifically, light amount adjuster 14 determines whether representative distance X belongs to the distance range of the first range (i.e., whether representative distance X is less than 20 cm) (S4). When representative distance X belongs to the distance range of the first range (Yes in S4), light amount adjuster 14 determines the set count of the first range (i.e., 200) as the emission count and the exposure count for measuring the distance in the next frame (S5).

Meanwhile, when representative distance X does not belong to the distance range of the first range (No in S4), light amount adjuster 14 then determines whether representative distance X belongs to the distance range of the second range (i.e., whether representative distance X is no less than 20 cm but less than 70 cm) (S6). When representative distance X belongs to the distance range of the second range (Yes in S6), light amount adjuster 14 determines the set count of the second range (i.e., 300) as the emission count and the exposure count for measuring the distance in the next frame (S7).

Meanwhile, when representative distance X does not belong to the distance range of the second range (No in S6), light amount adjuster 14 then determines whether representative distance X belongs to the distance range of the third range (i.e., whether representative distance X is no less than 70 cm but less than 120 cm) (S8). When representative distance X belongs to the distance range of the third range (Yes in S8), light amount adjuster 14 determines the set count of the third range (i.e., 500) as the emission count and the exposure count for measuring the distance in the next frame (S9).

Meanwhile, when representative distance X does not belong to the distance range of the third range (No in S8), light amount adjuster 14 determines that representative distance X belongs to the distance range of the fourth range (i.e., that representative distance X is no less than 120 cm) and determines the set count of the fourth range (i.e., 700) as the emission count and the exposure count for measuring the distance in the next frame (S10).

In this manner, upon the operation for one frame having been finished (S11), a similar operation is performed for the next frame (S2 to S10). Specifically, light amount adjuster 14 starts an operation for one frame by causing light emitter 11 to emit light pulses in accordance with the determined emission count and light receiver 12 to receive reflected light in accordance with the determined exposure count (S2). Light amount adjuster 14 then calculates representative distance X to the object with use of the distance image generated by distance calculator 13 (S3). On the basis of calculated representative distance X, light amount adjuster 14 further determines one set count selected from the plurality of set counts corresponding to the respective preset distance ranges as the emission count and the exposure count for measuring the distance in the next frame (S4 to S10).

The foregoing operation (S2 to S11) for each frame is performed iteratively until light amount adjuster 14 receives a stop instruction from the user.

As described thus far, distance image generating device 10 according to the present embodiment includes light emitter 11, light receiver 12, distance calculator 13, and light amount adjuster 14. Light emitter 11 emits light pulses to an object. Light receiver 12 includes a plurality of light receiving elements. Light receiver 12 receives reflected light corresponding to the light pulses in an exposure period associated with an emission period of the light pulses. Distance calculator 13 generates a distance image by calculating a distance to the object from each of the plurality of light receiving elements on the basis of an amount of reflected light received by light receiver 12. Light amount adjuster 14 determines an emission count in accordance with which light emitter 11 is to emit the light pulses and an exposure count in accordance with which light receiver 12 is to receive the reflected light on the basis of the distance image generated by distance calculator 13. Light amount adjuster 14 also causes light emitter 11 to emit the light pulses in accordance with the determined emission count and light receiver 12 to receive the reflected light in accordance with the determined exposure count. Distance calculator 13 calculates the distance on the basis of an amount of reflected light received in accordance with the exposure count by light receiver 12.

With this configuration, the amount of light to be emitted by light emitter 11 is adjusted as the emission count in accordance with which light emitter 11 is to emit the light pulses and the exposure count in accordance with which light receiver 12 is to receive the reflected light are adjusted. Therefore, the above configuration renders a dedicated light source driver or analog control for adjusting the intensity of the light pulses unnecessary, making it possible to achieve distance image generating device 10 capable of adjusting the required amount of light to be emitted for measuring the distance more simply than before.

Light amount adjuster 14 calculates a representative distance to the object with use of the distance image and determines, as the emission count and the exposure count, one set count selected from a plurality of set counts corresponding to a plurality of preset distance ranges on the basis of the calculated representative distance.

With this configuration, the amount of light to be emitted may be adjusted appropriately in accordance with the representative distance to the object.

In an initial state in which no distance image has been generated, light amount adjuster 14 determines, as the emission count and the exposure count, the set count corresponding to a shortest distance range among a plurality of distance ranges.

With this configuration, the emission count and the exposure count are set in a short period of time when the object is close to distance image generating device 10.

A minimum value among the plurality of set counts is set to a value suitable for measuring a shortest of a distance range to be measured.

This configuration suppresses, in the process of determining the emission count and the exposure count, a disadvantage that the emission count and the exposure count are set to a count smaller than the count required for measuring the smallest distance that can be measured.

A maximum value among the plurality of set counts is set to a value suitable for measuring a longest of a distance range to be measured.

This configuration suppresses, in the process of determining the emission count and the exposure count, a disadvantage that the emission count and the exposure count are set to a count greater than the count required for measuring the greatest distance that can be measured.

In one method of controlling light emitter 11 and light receiver 12 (total-duration constant mode), light amount adjuster 14 causes light emitter 11 to emit the light pulses in accordance with the determined emission count in a preset duration and light receiver 12 to receive the reflected light in accordance with the determined exposure count.

With this configuration, even when the object is moving, the total duration required for emission and exposure stays constant across frames, and thus the distance to the moving object is measured iteratively and in a stable manner.

In another method of controlling light emitter 11 and light receiver 12 (time-interval constant mode), light amount adjuster 14 causes light emitter 11 to iteratively emit the light pulses in accordance with the emission count at a preset constant time interval and light receiver 12 to iteratively receive the reflected light in accordance with the exposure count at the constant time interval.

With this configuration, when the distance to the object is short, emission and exposure are completed and a distance image is generated in a short period of time in each frame.

Distance calculator 13 iteratively generates the distance image at a frame cycle, and light amount adjuster 14, iteratively for each frame, determines the emission count and the exposure count in a second frame following a first frame on the basis of the distance image of the first frame and controls light emitter 11 and light receiver 12.

With this configuration, the distance to the object is measured in each frame and the emission count and the exposure count in a subsequent frame is determined iteratively. Thus, even when the object is moving, the distance is measured with an appropriate amount of light to be emitted in accordance with a change in the distance to the object.

Light emitter 11 emits light pulses having a fixed emission period, and distance calculator 13 calculates the distance to the object with use of the emission period and the amount of a plurality of reflected light in the exposure period associated with the emission period for a plurality of the light pulses.

With this configuration, the distance to the object is calculated with use of the amount of the plurality of reflected light. Thus, the distance can be calculated quickly through the same algorithm (i.e., the expression (1)) without depending on the emission count and the exposure count.

A distance image generating method according to the present embodiment is a method of generating a distance image with distance image generating device 10. Distance image generating device 10 includes light emitter 11 and light receiver 12. Light emitter 11 emits light pulses to an object. Light receiver 12 includes a plurality of light receiving elements and receives reflected light corresponding to the light pulses in an exposure period associated with an emission period of the light pulses. The distance image generating method includes generating a distance image by calculating a distance to the object from each of the plurality of light receiving elements on the basis of an amount of the reflected light received by light receiver 12 (S3); and adjusting the amount of reflected light (S4 to S10, S2) including determining an emission count in accordance with which light emitter 11 is to emit the light pulses and an exposure count in accordance with which light receiver 12 is to receive the reflected light on the basis of the distance image generated in the generating. The adjusting (S4 to S10, S2) also includes causing light emitter 11 to emit the light pulses in accordance with the determined emission count and light receiver 12 to receive the reflected light in accordance with the determined exposure count. In the generating (S2), the distance is calculated on the basis of an amount of the reflected light received in accordance with the exposure count by light receiver 12.

With this configuration, the amount of light to be emitted by light emitter 11 is adjusted as the emission count in accordance with which light emitter 11 is to emit the light pulses and the exposure count in accordance with which light receiver 12 is to receive the reflected light are adjusted. Therefore, the above configuration renders a dedicated light source driver or analog control for adjusting the intensity of the light pulses unnecessary, making it possible to achieve the distance image generating method that allows for adjustment of the required amount of light to be emitted for measuring the distance more simply than before.

Variation 1

A distance image generating device according to Variation 1 of the foregoing embodiment will now be described. The distance image generating device according to the present variation basically has a configuration similar to that of distance image generating device 10 according to the foregoing embodiment. In the present variation, however, in determining the emission count and the exposure count, light amount adjuster 14 determines, as the emission count and the exposure count, in addition to the plurality of set counts corresponding to the plurality of distance ranges illustrated in FIG. 5, a preset upper limit count and a preset lower limit count when a representative distance satisfies a predetermined condition. To be more specific, light amount adjuster 14 determines the preset lower limit count as the emission count and the exposure count when the representative distance belongs to the distance range of the first range and when saturation of light receiver 12 has been detected. Meanwhile, light amount adjuster 14 determines the preset upper limit count as the emission count and the exposure count when the representative distance belongs to the distance range of the fourth range and when an output signal from light receiver 12 is determined not to be greater than a threshold. The saturation of light receiver 12 corresponds to a state in which light receiver 12 has received light in an amount exceeding a maximum amount that light receiver 12 can receive light.

Figure 7:
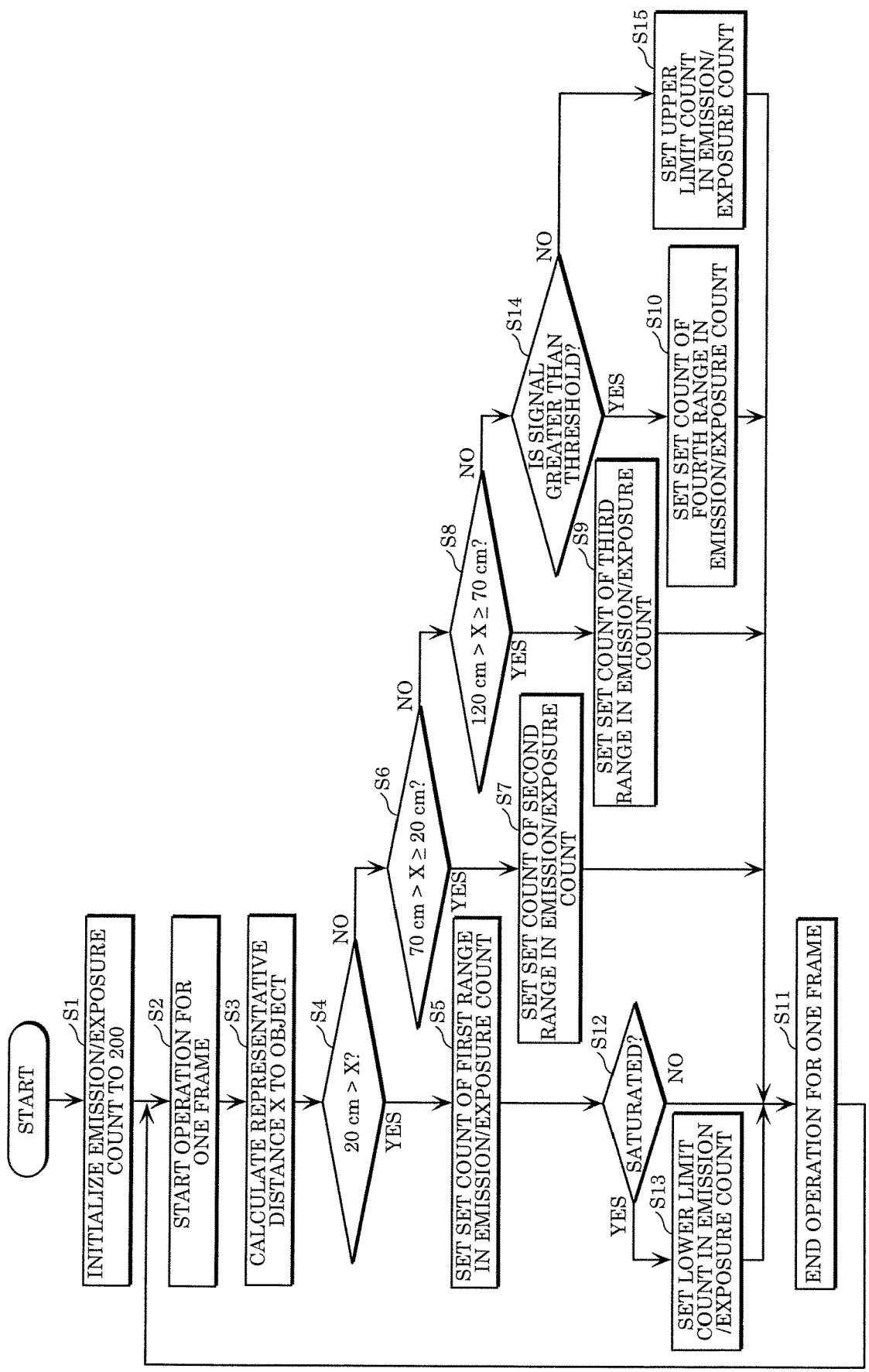
FIG. 7 is a flowchart illustrating an operation of a distance image generating device according to Variation 1 of an embodiment.

FIG. 7 is a flowchart illustrating an operation of the distance image generating device according to Variation 1 of the embodiment. Steps S12, S13, S14, and S15 are added to the flowchart in the foregoing embodiment. In the following, steps that are identical to those in the foregoing embodiment are given identical reference numerals, and with descriptions thereof being omitted, only the differences will be described.

After light amount adjuster 14 has determined in step S4 that representative distance X belongs to the distance range of the first range (Yes in S4) and determined the set count of the first range (i.e., 200) as the emission count and the exposure count for measuring the distance in the next frame (S5), light amount adjuster 14 determines whether light receiver 12 is saturated (S12). Specifically, light amount adjuster 14 determines whether the total amount of received light A0 in the A0 exposure in the most recent instance of step S2 exceeds a first threshold corresponding to saturation of light receiver 12.

When light amount adjuster 14 has determined that light receiver 12 is saturated (Yes in S12), light amount adjuster 14 determines the preset lower limit count as the emission count and the exposure count for measuring the distance in the next frame (S13). The preset lower limit count is, for example, the lowest count that allows the distance to be calculated and is specifically 1.

Meanwhile, when light amount adjuster 14 has determined that light receiver 12 is not saturated (No in S12), light amount adjuster 14 makes no change to the emission count and the exposure count. In other words, light amount adjuster 14 determines the set count of the first range (i.e., 200) as the emission count and the exposure count for measuring the distance in the next frame.

When light amount adjuster 14 has determined in step S8 that representative distance X does not belong to the distance range of the third range (No in S8), light amount adjuster 14 determines whether the output signal from light receiver 12 is greater than a threshold (S14). Specifically, light amount adjuster 14 determines whether the total amount of received light A0 in the A0 exposure in the most recent instance of step S2 exceeds a second threshold corresponding to the lowest sensitivity of light receiver 12.

When light amount adjuster 14 has determined that the output signal from light receiver 12 is greater than the threshold (Yes in S14), as in the foregoing embodiment, light amount adjuster 14 determines the set count of the fourth range (i.e., 700) as the emission count and the exposure count for measuring the distance in the next frame (S10).

Meanwhile, when light amount adjuster 14 has determined that the output signal from light receiver 12 is not greater than the threshold (No in S14), light amount adjuster 14 determines the preset upper limit count as the emission count and the exposure count for measuring the distance in the next frame (S15). The preset upper limit count is, for example, a maximum emission count and a maximum exposure count that are allowed in one frame.

As described thus far, in the distance image generating device according to the present variation, light amount adjuster 14 determines a preset upper limit count or lower limit count as the emission count and the exposure count when the representative distance satisfies a predetermined condition. Specifically, light amount adjuster 14 determines the lower limit count as the emission count and the exposure count when, as a case in which the predetermined condition is satisfied, the representative distance is less than a shortest distance range among the plurality of distance ranges and the amount of the reflected light exceeds a first threshold.

With this configuration, when light receiver 12 is saturated as the object is very close to the distance image generating device, the lower limit count that is different from the set counts corresponding to the plurality of distance ranges is determined as the emission count and the exposure count. Therefore, as compared to the foregoing embodiment, a highly accurate distance image is generated in a broader distance range.

Light amount adjuster 14 determines the upper limit count as the emission count and the exposure count when, as a case in which the predetermined condition is satisfied, the representative distance is greater than a longest distance range among the plurality of distance ranges and the amount of the reflected light is less than a second threshold.

With this configuration, when the output signal from light receiver 12 is small as the object is very far from the distance image generating device, the upper limit count that is different from the set counts corresponding to the plurality of distance ranges is determined as the emission count and the exposure count. Therefore, as compared to the foregoing embodiment, a highly accurate distance image is generated in a broader distance range.

Variation 2

A distance image generating device according to Variation 2 of the foregoing embodiment will now be described. The distance image generating device according to the present variation basically has a configuration similar to that of distance image generating device 10 according to the foregoing embodiment. The present variation, however, corresponds to a further variation of Variation 1 of the foregoing embodiment. Specifically, in the present variation, in addition to the process in Variation 1 of the foregoing embodiment, in an initial state in which no distance image has been generated, light amount adjuster 14 determines, as the emission count and the exposure count, the set count corresponding to the longest distance range among the plurality of distance ranges. In other words, in the foregoing embodiment and Variation 1, light amount adjuster 14 determines, as the initial value of the emission count and the exposure count, the set count corresponding to the shortest distance range among the plurality of distance ranges. In contrast, in the present variation, light amount adjuster 14 determines, as the initial value of the emission count and the exposure count, the set count corresponding to the longest distance range.

Figure 8:
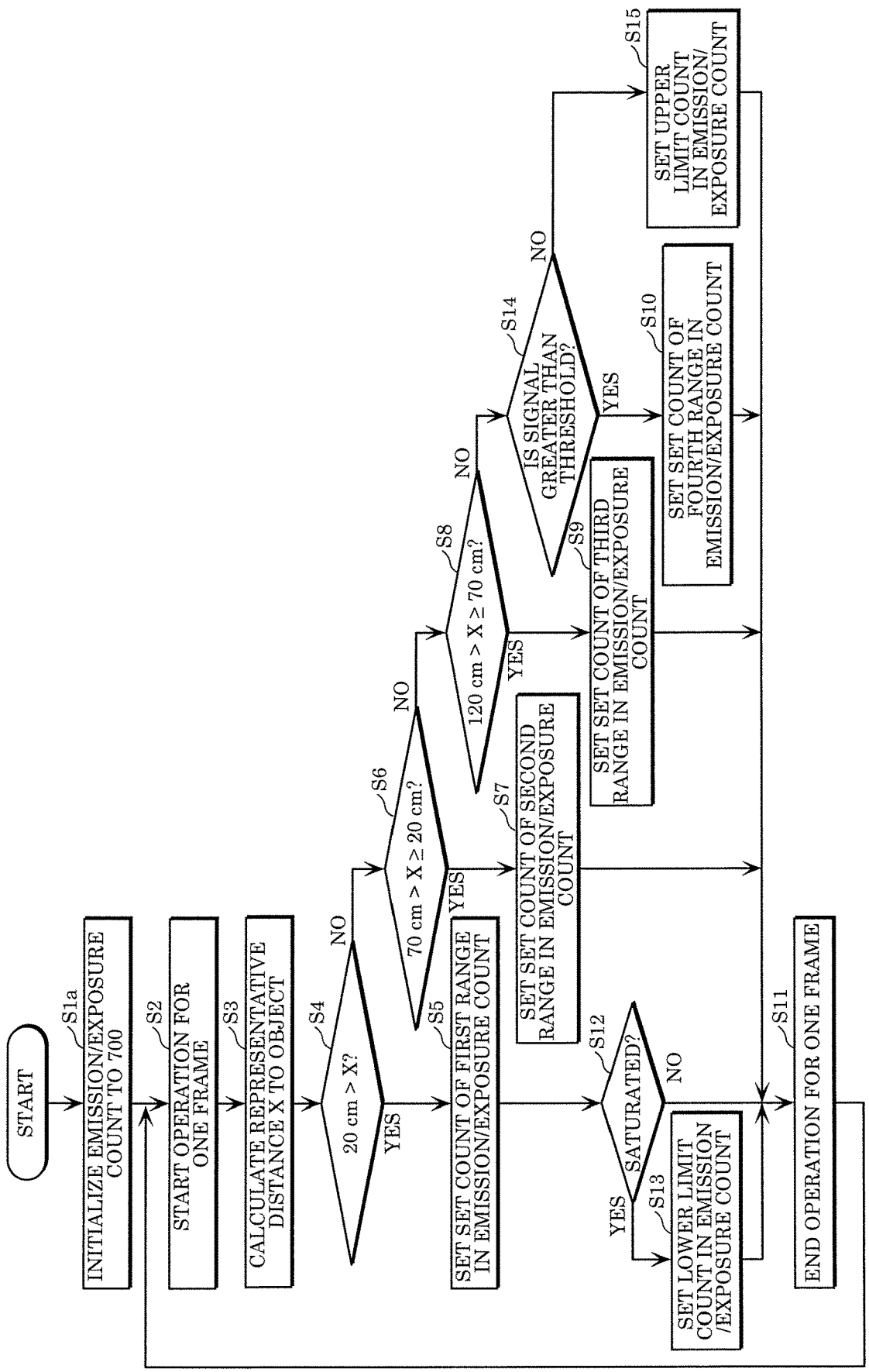
FIG. 8 is a flowchart illustrating an operation of a distance image generating device according to Variation 2 of an embodiment.

FIG. 8 is a flowchart illustrating an operation of the distance image generating device according to Variation 2 of the embodiment. This flowchart differs from the flowchart in Variation 1 of the foregoing embodiment only in step S1a at the beginning. In the following, steps that are identical to those in the foregoing embodiment and Variation 1 are given identical reference numerals, and with descriptions thereof being omitted, only the differences will be described.

In initialization, in an initial state in which no distance image has been generated, light amount adjuster 14 determines, as the emission count and the exposure count, the set count corresponding to the longest distance range among the plurality of distance ranges (S1a). Specifically, light amount adjuster 14 determines the set count corresponding to the fourth range (700 in this example) as the initial value of the emission count and the exposure count (i.e., initializes the emission count and the exposure count). The processes thereafter are the same as those in Variation 1 described above.

As described thus far, in the distance image generating device according to the present variation, in an initial state in which no distance image has been generated, light amount adjuster 14 determines, as the emission count and the exposure count, the set count corresponding to the longest distance range among the plurality of distance ranges.

With this configuration, the emission count and the exposure count are set in a short period of time when the object is located far from distance image generating device 10.

Variation 3

A distance image generating device according to Variation 3 of the foregoing embodiment will now be described. The distance image generating device according to the present variation basically has a configuration similar to that of distance image generating device 10 according to the foregoing embodiment. In the present variation, however, in determining the emission count and the exposure count, light amount adjuster 14 uses, in place of the set counts corresponding to the respective preset distance ranges, set counts corresponding to respective preset distances. Only the differences from the foregoing embodiment will be described below.

FIG. 9A illustrates an example of set counts corresponding to the respective preset distances to be used by light amount adjuster 14 according to Variation 3 of the embodiment. FIG. 9A corresponds to FIG. 5 in the foregoing embodiment. In the present variation, the set counts (i.e., the emission count and the exposure count to be determined) of 200, 400, and 700 are set for the respective distances defining the boundaries between the plurality of distance ranges, that is, the distances of 20 cm, which is the shortest distance, 70 cm, and 120 cm, respectively. With use of these set counts, light amount adjuster 14 determines the emission count and the exposure count corresponding to representative distance X.

Figure 9B:
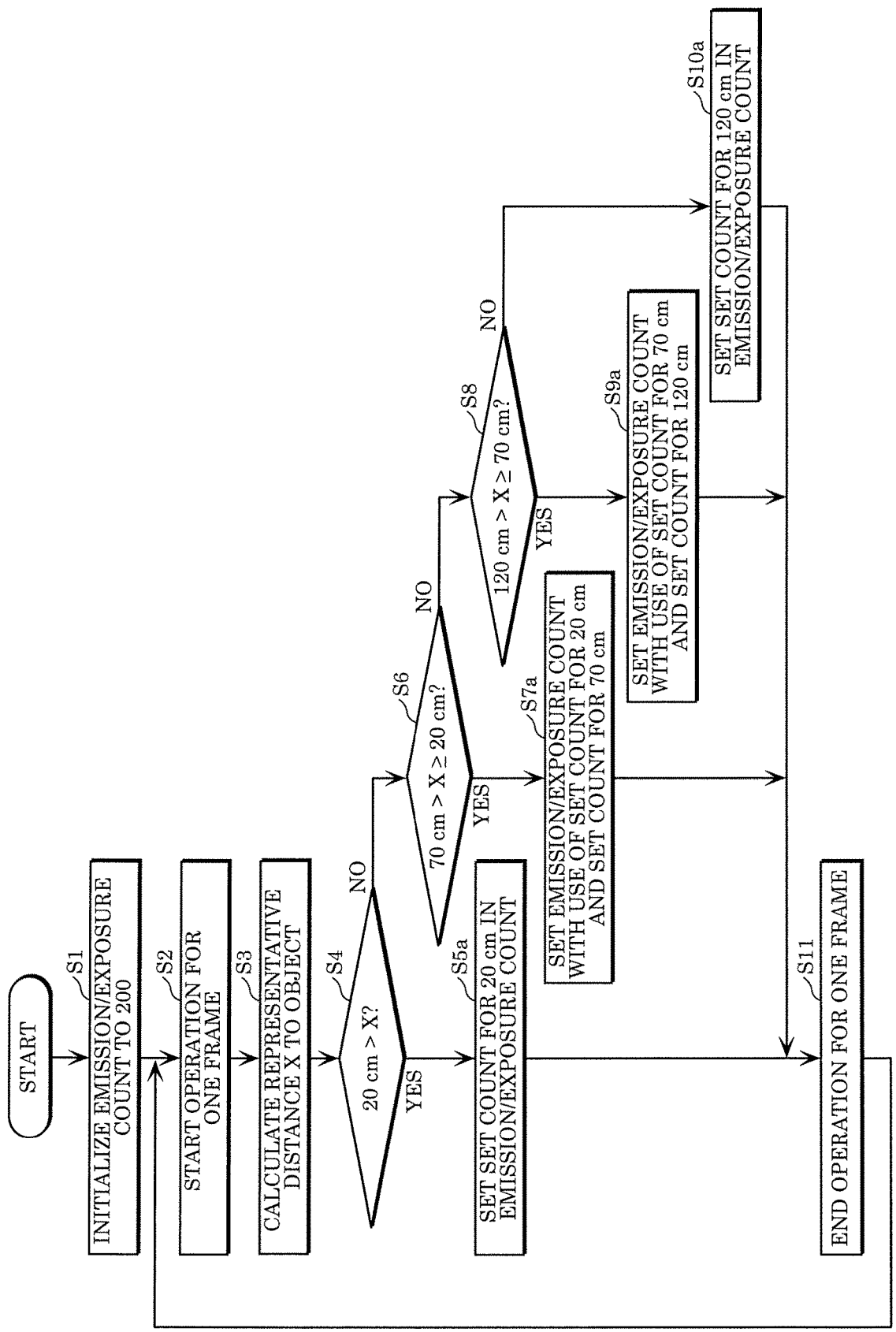
FIG. 9B is a flowchart illustrating an operation of a distance image generating device according to Variation 3 of an embodiment.

FIG. 9B is a flowchart illustrating an operation of the distance image generating device according to Variation 3 of the embodiment. In this flowchart, steps S5, S7, S9, and S10 in the flowchart in the foregoing embodiment are replaced with S5a, S7a, S9a, and S10a, respectively. In the following, steps that are identical to those in the foregoing embodiment are given identical reference numerals, and with descriptions thereof being omitted, only the differences will be described.

When light amount adjuster 14 has determined that representative distance X belongs to the distance range of the first range (i.e., representative distance X is less than 20 cm) (Yes in S4), light amount adjuster 14 determines the set count corresponding to 20 cm (i.e., 200) as the emission count and the exposure count for measuring the distance in the next frame (S5a).

When light amount adjuster 14 has determined that representative distance X belongs to the distance range of the second range (i.e., representative distance X is no less than 20 cm but less than 70 cm) (Yes in S6), light amount adjuster 14 determines the emission count and the exposure count for measuring the distance in the next frame with use of the set count corresponding to 20 cm (i.e., 200) and the set corresponding to 70 cm (i.e., 400) (S7a). Specifically, as indicated in the following expression (4), light amount adjuster 14 determines, as the emission count and the exposure count for measuring the distance in the next frame, the set count obtained by proportionally allocating 200 and 400 in accordance with representative distance X.

$$\text{set count} = 200 + (400-200) \times (X-20)/(70-20) \quad (4)$$

When light amount adjuster 14 has determined that representative distance X belongs to the distance range of the third range (i.e., representative distance X is no less than 70 cm but less than 120 cm) (Yes in S8), light amount adjuster 14 determines the emission count and the exposure count for measuring the distance in the next frame with use of the set count corresponding to 70 cm (i.e., 400) and the set count corresponding to 120 cm (i.e., 700) (S9a). Specifically, as indicated in the following expression (5), light amount adjuster 14 determines, as the emission count and the exposure count for measuring the distance in the next frame, the set count obtained by proportionally allocating 400 and 700 in accordance with representative distance X.

$$\text{set count}=400+(700-400)\times(X-70)/(120-70) \quad (5)$$

Meanwhile, when representative distance X does not belong to the distance range of the third range (No in S8), light amount adjuster 14 determines that representative distance X belongs to the distance range of the fourth range (i.e., representative distance X is no less than 120 cm). Then, light amount adjuster 14 determines the distance range corresponding to 120 cm (i.e., 700) as the emission count and the exposure count for measuring the distance in the next frame (S10a).

As described thus far, the distance image generating device according to the present variation includes light emitter 11, light receiver 12, distance calculator 13, and light amount adjuster 14. Light emitter 11 emits light pulses to an object. Light receiver 12 includes a plurality of light receiving elements. Light receiver 12 receives reflected light corresponding to the light pulses in an exposure period associated with an emission period of the light pulses. Distance calculator 13 generates a distance image by calculating a distance to the object from each of the plurality of light receiving elements on the basis of an amount of the reflected light received by light receiver 12. Light amount adjuster 14 determines an emission count in accordance with which light emitter 11 is to emit the light pulses and an exposure count in accordance with which light receiver 12 is to receive the reflected light on the basis of the distance image generated by distance calculator 13. Light amount adjuster 14 also causes light emitter 11 to emit the light pulses in accordance with the determined emission count and light receiver 12 to receive the reflected light in accordance with the determined exposure count. Distance calculator 13 calculates the distance on the basis of an amount of the reflected light received in accordance with the exposure count by light receiver 12.

With this configuration, the amount of light to be emitted by light emitter 11 is adjusted as the emission count in accordance with which light emitter 11 is to emit the light pulses and the exposure count in accordance with which light receiver 12 is to receive the reflected light are adjusted. Therefore, the above configuration renders a dedicated light source driver or analog control for adjusting the intensity of the light pulses unnecessary, making it possible to achieve distance image generating device 10 capable of adjusting the required amount of light to be emitted for measuring the distance more simply than before.

Light amount adjuster 14 calculates a representative distance to the object with use of the distance image and determines, as the emission count and the exposure count, the set count identified with use of at least one set count selected from a plurality of set counts corresponding to a plurality of preset distances on the basis of the calculated representative distance.

With this configuration, the amount of light to be emitted may be adjusted appropriately in accordance with the representative distance to the object.

A minimum value among the plurality of set counts is set to a value (200 in this variation) suitable for measuring a shortest (20 cm in this variation) of a distance range to be measured.

This configuration suppresses, in the process of determining the emission count and the exposure count, a disadvantage that the emission count and the exposure count are set to a count smaller than the count required for measuring the smallest distance that can be measured.

A maximum value among the plurality of set counts is set to a value (700 in this variation) suitable for measuring a longest (120 cm in this variation) of a distance range to be measured.

This configuration suppresses, in the process of determining the emission count and the exposure count, a disadvantage that the emission count and the exposure count are set to a count greater than the count required for measuring the greatest distance that can be measured.

Thus far, the distance image generating device and the distance image generating method according to some aspects of the present disclosure have been described on the basis of the embodiment and Variations 1 to 3 thereof. The present disclosure, however, is not limited by the embodiment and variations. Unless departing from the spirit of the present disclosure, an embodiment obtained by making various modifications that a person skilled in the art can conceive of to the present embodiment and variations and another embodiment constructed by combining some of the constituent elements in the embodiment and variations are also encompassed by the scope of the present disclosure.

For examples, in the foregoing embodiment and variations, the system with two exposures illustrated in FIG. 3 is used as the method of measuring the distance through TOF, but this is not a limiting example. For example, employed may be a system with one exposure in which the distance is calculated with use of, of one reflected light, the amount of reflected light in a period preceding the end timing of an emitted pulse and the amount of reflected light in a period following the end timing of an emitted pulse.

The number and the specific values of the plurality of distance ranges and the set counts illustrated in FIG. 5 and the number and the specific values of the plurality of distances and the set counts illustrated in FIG. 3 are merely examples and are not limited to these values.

In the foregoing embodiment and variations, the set count corresponding to the shortest or longest distance range or distance is used for the initial value of the emission count and the exposure count, but this is not a limiting example. For example, the initial value may be a value that lies between the set count corresponding to the shortest distance range or distance and the set count corresponding to the longest distance range or distance. Thus, when the distance between an object and distance image generating device 10 falls between the shortest distance and the longest distance, the emission count and the exposure count are set in a short period of time.

In the foregoing embodiment and variations, when light amount adjuster 14 determines the emission count and the exposure count, the reference distance range or distance against which representative distance X is compared shifts from the shortest distance range or distance to the longest distance range or distance. The order of the comparison is not limited to the above, and the distance range or distance against which representative distance X is compared may shift from the longest distance range or distance to the shortest distance range or distance. Thus, when the distance between an object and the distance image generating device is relatively large, the emission count and the exposure count may be determined in a short period of time.

In the foregoing embodiment and variations, the emission count and the exposure count in the second frame immediately following the first frame are determined on the basis of the representative distance obtained in the first frame, but this time interval is not limiting. For example, the emission count and the exposure count in a third frame that comes two frames after the first frame may be determined on the basis of the representative distance obtained in the first frame. Such a time interval may be determined in accordance with the processing load required for determining the emission count and the exposure count.

In the foregoing embodiment and variations, the emission count and the exposure count are determined on the basis of the representative distance obtained in a single frame. Alternatively, the emission count and the exposure count may be determined on the basis of the representative distance obtained in two or more frames. Thus, when the distance to an object has changed, the change in the emission count and the exposure count to be determined becomes gentle.

Although only an exemplary embodiment of the present disclosure have been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure finds its use in distance image generating devices and, in particular, in a distance image generating device and a distance image sensor capable of adjusting the required amount of light to be emitted for measuring the distance in a simple manner.

What is claimed is:

1. A distance image generating device, comprising:
a light emitter that emits light pulses to an object;
a light receiver that includes a plurality of light receiving elements, the light receiver receiving reflected light corresponding to the light pulses in an exposure period associated with an emission period of the light pulses;
a distance calculator that generates a distance image by calculating a distance to the object from each of the plurality of light receiving elements, based on an amount of the reflected light received by the light receiver; and
a light amount adjuster that
determines an emission count in accordance with which the light emitter is to emit the light pulses and an exposure count in accordance with which the light receiver is to receive the reflected light, based on the distance image generated by the distance calculator, and
causes the light emitter to emit the light pulses in accordance with the emission count determined by the light amount adjuster and the light receiver to receive the reflected light in accordance with the exposure count determined by the light amount adjuster, wherein:
the distance calculator calculates the distance, based on an amount of the reflected light received in accordance with the exposure count by the light receiver, and
the light amount adjuster calculates a representative distance to the object with use of the distance image and determines, as the emission count and the exposure count, one set count selected from a plurality of set counts corresponding to a plurality of preset distance ranges, based on the representative distance calculated by the light amount adjuster.

2. The distance image generating device according to claim 1, wherein
the light amount adjuster further determines one of an upper limit count and a lower limit count that are preset as the emission count and the exposure count when the representative distance satisfies a predetermined condition.

3. The distance image generating device according to claim 2, wherein
the light amount adjuster determines the lower limit count as the emission count and the exposure count when, as a case in which the predetermined condition is satisfied, the representative distance is less than a shortest distance range among the plurality of distance ranges and the amount of the reflected light exceeds a first threshold.

4. The distance image generating device according to claim 2, wherein
the light amount adjuster determines the upper limit count as the emission count and the exposure count when, as a case in which the predetermined condition is satisfied, the representative distance is greater than a longest distance range among the plurality of distance ranges and the amount of the reflected light is less than a second threshold.

5. The distance image generating device according to claim 1, wherein
in an initial state in which no distance image has been generated, the light amount adjuster determines, as the emission count and the exposure count, the one set count corresponding to a shortest distance range among the plurality of distance ranges.

6. The distance image generating device according to claim 1, wherein
in an initial state in which no distance image has been generated, the light amount adjuster determines, as the emission count and the exposure count, the set count corresponding to a longest distance range among the plurality of distance ranges.

7. The distance image generating device according to claim 1, wherein
a minimum value among the plurality of set counts is set to a value suitable for measuring a shortest of a distance range to be measured.

8. The distance image generating device according to claim 1, wherein
a maximum value among the plurality of set counts is set to a value suitable for measuring a longest of a distance range to be measured.

9. The distance image generating device according to claim 1, wherein
the light amount adjuster causes the light emitter to emit the light pulses in accordance with the emission count determined by the light amount adjuster in a preset duration and the light receiver to receive the reflected light in accordance with the exposure count determined by the light amount adjuster.

10. The distance image generating device according to claim 1, wherein
the light amount adjuster causes the light emitter to iteratively emit the light pulses in accordance with the emission count at a preset constant time interval and the light receiver to iteratively receive the reflected light in accordance with the exposure count at the preset constant time interval.

11. The distance image generating device according to claim 1, wherein
the distance calculator iteratively generates the distance image at a frame cycle, and
the light amount adjuster, iteratively for each frame, determines the emission count and the exposure count in a second frame following a first frame, based on the distance image of the first frame and controls the light emitter and the light receiver.

12. The distance image generating device according to claim 1, wherein
the light emitter emits light pulses having a fixed emission period, and
the distance calculator calculates the distance to the object with use of the emission period and an amount of a plurality of the reflected light in an exposure period associated with the emission period for a plurality of the light pulses.

13. A distance image generating method of generating a distance image with a distance image generating device, the distance image generating device including a light emitter that emits light pulses to an object and a light receiver that includes a plurality of light receiving elements and receives reflected light corresponding to the light pulses in an exposure period associated with an emission period of the light pulses, the distance image generating method comprising:
generating a distance image by calculating a distance to the object from each of the plurality of light receiving elements, based on an amount of the reflected light received by the light receiver; and
adjusting the amount of the reflected light including:
determining an emission count in accordance with which the light emitter is to emit the light pulses and an exposure count in accordance with which the light receiver is to receive the reflected light, based on the distance image generated in the generating, and
causing the light emitter to emit the light pulses in accordance with the emission count determined in the adjusting and the light receiver to receive the reflected light in accordance with the exposure count determined in the adjusting, wherein:
in the generating, the distance is calculated based on an amount of the reflected light received in accordance with the exposure count by the light receiver, and
in the adjusting the amount of the reflected light, calculating a representative distance to the object is calculated with use of the distance image, and one set count selected from a plurality of set counts corresponding to a plurality of preset distance ranges is determined as the emission count and the exposure count, based on the representative distance.

14. The distance image generating method according to claim 13, wherein
in the adjusting the amount of the reflected light, one of an upper limit count and a lower limit count that are preset is determined as the emission count and the exposure count when the representative distance satisfies a predetermined condition.

15. The distance image generating method according to claim 14, wherein
in the adjusting the amount of the reflected light, the lower limit count is determined as the emission count and the exposure count when, as a case in which the predetermined condition is satisfied, the representative distance is less than a shortest distance range among the plurality of distance ranges and the amount of the reflected light exceeds a first threshold.

16. The distance image generating method according to claim 14, wherein
in the adjusting the amount of the reflected light, the upper limit count is determined as the emission count and the exposure count when, as a case in which the predetermined condition is satisfied, the representative distance is greater than a longest distance range among the plurality of distance ranges and the amount of the reflected light is less than a second threshold.

17. The distance image generating method according to claim 13, wherein
in an initial state in which no distance image has been generated, the adjusting the amount of the reflected light includes determining, as the emission count and the exposure count, the one set count corresponding to a shortest distance range among the plurality of distance ranges.

18. The distance image generating method according to claim 13, wherein
in an initial state in which no distance image has been generated, the adjusting the amount of the reflected light includes determining, as the emission count and the exposure count, the set count corresponding to a longest distance range among the plurality of distance ranges.

19. The distance image generating method according to claim 13, wherein
a minimum value among the plurality of set counts is set to a value suitable for measuring a shortest of a distance range to be measured.

20. The distance image generating method according to claim 13, wherein
a maximum value among the plurality of set counts is set to a value suitable for measuring a longest of a distance range to be measured.

* * * * *